(12) United States Patent
DeBoni

(10) Patent No.: US 6,433,500 B1
(45) Date of Patent: Aug. 13, 2002

(54) VEHICLE WINDOW POSITION SENSOR

(75) Inventor: Albert DeBoni, Shelby Township, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/891,893

(22) Filed: Jun. 26, 2001

(51) Int. Cl.[7] .............................................. H02P 1/04
(52) U.S. Cl. ...................... 318/443; 318/266; 318/267; 318/280; 318/286; 318/432; 318/434; 318/445; 318/446; 318/466; 74/479.01
(58) Field of Search ................................ 318/266, 267, 318/280, 286, 432, 434, 466, 445, 446, 443; 74/479.01

(56) References Cited

U.S. PATENT DOCUMENTS

| | | | |
|---|---|---|---|
| 4,536,687 A | * | 8/1985 | Kurihara et al. ............ 318/480 |
| 4,808,894 A | | 2/1989 | Mizuta |
| 4,931,714 A | | 6/1990 | Yamamoto |
| 4,953,608 A | * | 9/1990 | Larsson ......................... 160/1 |
| 5,410,226 A | * | 4/1995 | Sekiguchi et al. ........... 318/266 |
| 5,532,560 A | | 7/1996 | Element et al. |
| 5,663,621 A | * | 9/1997 | Popat .......................... 318/480 |
| 6,135,513 A | * | 10/2000 | Hamada et al. ............. 292/201 |

* cited by examiner

Primary Examiner—Robert E. Nappi
Assistant Examiner—Tyrone Smith
(74) Attorney, Agent, or Firm—Tarolli, Sundheim, Covell, Tummino & Szabo L.L.P.

(57) ABSTRACT

An apparatus (10) for detecting a window open condition comprises a first photoelectric cell (60) mountable to the window (20) for providing a reference output signal (61) independent of the window open condition. The apparatus (10) also comprises a second photoelectric cell (62) mountable to the window and providing a signal (63) having a first characteristic if the window (20) is open and a second characteristic if the window is not open. The apparatus (10) further comprises comparison means (82) for comparing the reference output signal (61) with the signal from the second photoelectric cell (63). The comparison is indicative of the open condition of the window. The apparatus (10) comprises means (88) responsive to the comparison means (82) for indicating if the vehicle window (20) is in the open condition.

13 Claims, 5 Drawing Sheets

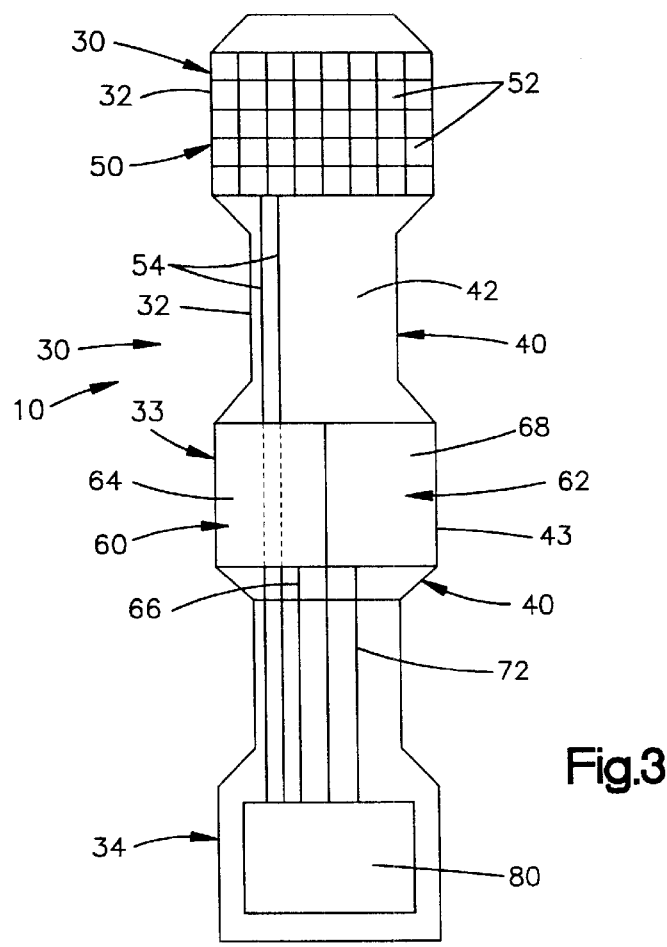
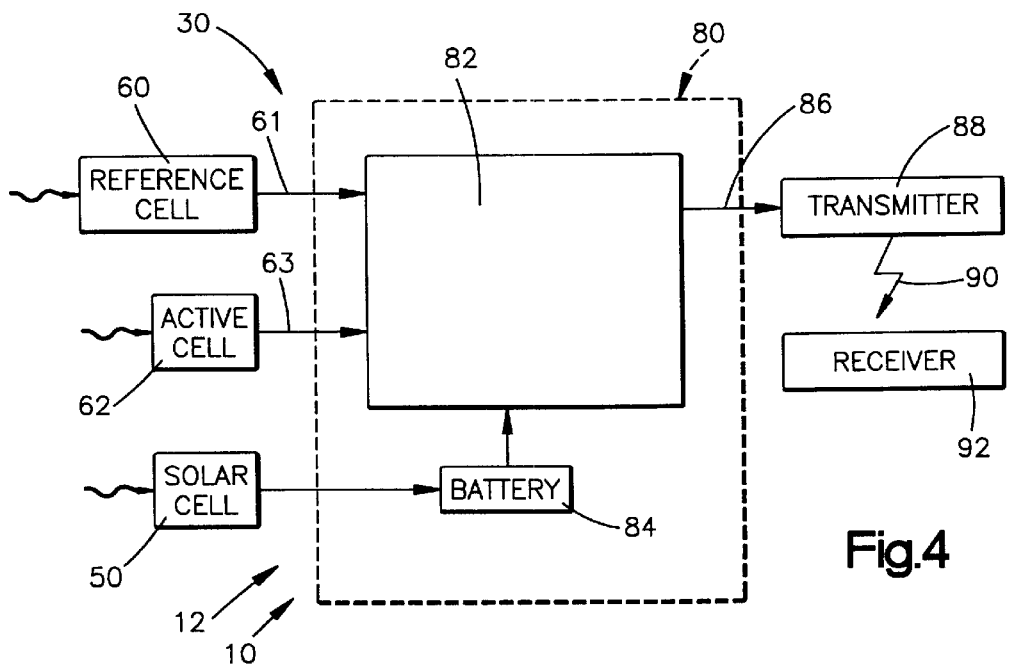
Fig.3
Fig.4

VEHICLE WINDOW POSITION SENSOR

FIELD OF THE INVENTION

The present invention relates to a vehicle window position sensor. In particular, the present invention relates to an apparatus for detecting if a vehicle window is open and for providing an output signal indicative of the open or closed state of the window.

BACKGROUND OF THE INVENTION

It is sometimes desirable to know whether a window in a vehicle is open or closed. For example, if the vehicle is exited and locked, a signal can be provided to alert the driver if a window is inadvertently left open.

There are known ways of detecting if a vehicle window is open and of providing an output signal indicative of the open or closed state of the window. For example, U.S. Pat. No. 4,808,894 discloses the use of a switch at the top of a door frame to indicate when a window is fully closed. U.S. Pat. No. 4,931,74 discloses the use of a slide rheostat to determine the position of a window along a window track. U.S. Pat. No. 5,410,226 discloses the use of signals indicative of motor rotation and current draw to sense an obstacle to the movement of a window along a window track. In addition, U.S. Pat. No. 5,532,560 discloses the use of a photoresistive sensor for sensing the amount of light striking a window area and, in response, controlling a Venetian blind.

SUMMARY OF THE INVENTION

The present invention is an apparatus for detecting a window open condition. The apparatus comprises a first photoelectric cell mountable to the window for providing a reference output signal independent of the window open condition. The apparatus also comprises a second photoelectric cell mountable to the window and providing a signal having a first characteristic if the window is open and a second characteristic if the window is not open. The apparatus further comprises comparison means for comparing the reference output signal with the signal from the second photoelectric cell, the comparison being indicative of the open condition of the window, and means responsive to the comparison means for indicating if the vehicle window is in the open condition.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIG. 3 is schematic illustration of the sensor assembly of FIG. 1;

FIG. 4 is a functional block diagram of the apparatus of FIG. 1;

DETAILED DESCRIPTION OF THE INVENTION

Figure 1:
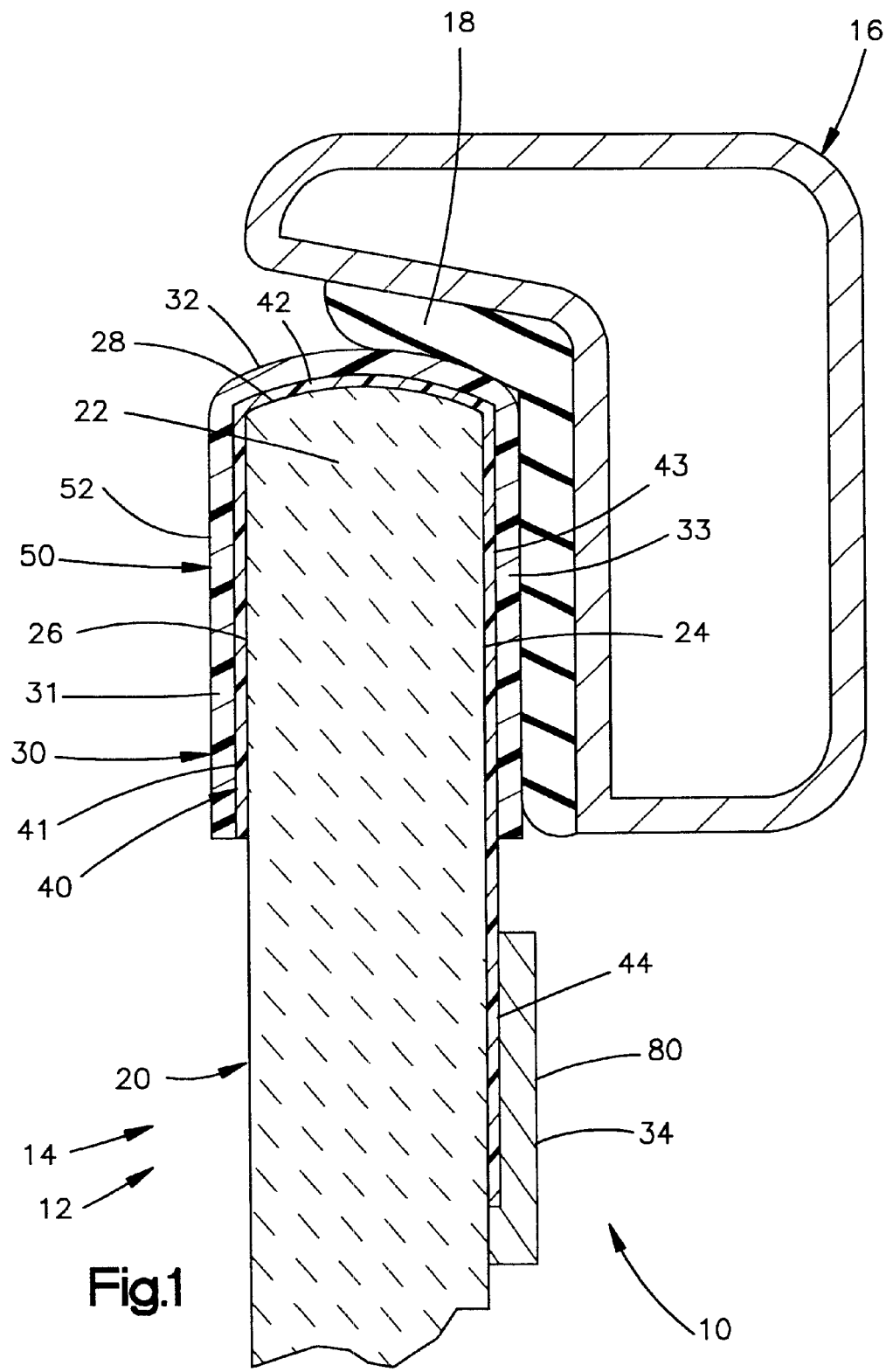
FIG. 1 is a sectional view of a portion of a vehicle including an apparatus in accordance with a first embodiment of the invention, the apparatus including a sensor assembly on a window shown in a closed condition.

The present invention relates to a vehicle window position sensor. In particular, the present invention relates to an apparatus for detecting if a vehicle window is open and for providing an output signal indicative of the open or closed state of the window. As representative of the present invention, FIGS. 1–4 illustrate an apparatus 10 in accordance with a first embodiment of the present invention.

The apparatus 10 forms part of a vehicle 12 that includes a door 14 having a door frame 16, only a portion of which is shown. The door frame 16 is made from an opaque material, such as steel. The door 14 also includes a seal 18 secured to the door frame 16. The seal 18 also is made from an opaque material, such as rubber.

The door 14 includes a window 20 that is supported for vertical movement within the door frame 16 relative to the door frame. The window 20 has an upper portion 22 that is movable into and out of engagement with the seal 18. The upper portion 22 of the window 20 has an inner side surface 24, an outer side surface 26, and a top edge surface 28. The window 20 is made from a transparent material, i.e., glass.

FIG. 1 shows the window 20 in an "up" or "closed" state or condition. When the window 20 is in the closed condition, the upper portion 22 of the window is located adjacent the door frame 16 and in engagement with the seal 18. The top edge surface 28 and the inner side surface 24 of the upper window portion 22 are covered by the seal 18 and are not exposed to ambient light.

Figure 2:
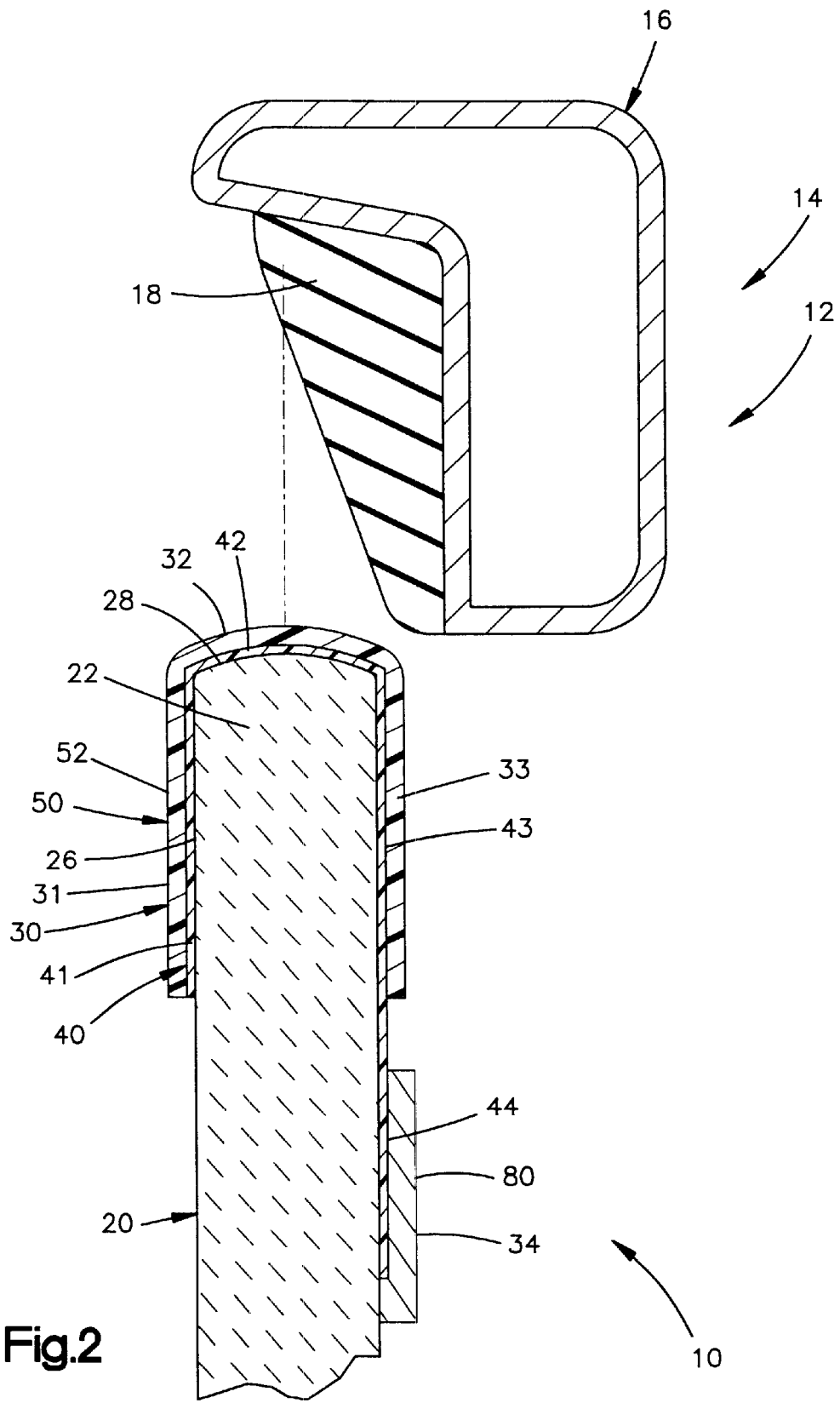
FIG. 2 is a view similar to FIG. 1 showing the window in an open condition.

FIG. 2 shows the window 20 in a "down" or "open" state or condition. When the window 20 is in the open condition, the upper portion 22 of the window 20 is spaced apart from the door frame portion 16 and from the seal 18. As a result, the top edge surface 28 and the inner side surface 24 of the upper window portion 22 are exposed to ambient light.

The apparatus 10 is shown in FIGS. 1 and 2 as being mounted on the exterior of the window 20. The apparatus 10 includes a sensor assembly 30 (FIGS. 1–3) having a first portion 31, a second portion 32, a third portion 33, and a fourth portion 34.

The sensor assembly 30 includes a flexible substrate 40 that extends along and forms a base for all four portions 31–34 of the sensor assembly. The substrate 40 is made from an opaque material. The substrate 40 is glued or otherwise adhered to the inner side surface 24, the outer side surface 26, and the top edge surface 28 of the window 20, thereby to secure the sensor assembly 30 to the window.

The first portion 31 of the sensor assembly 30 includes a solar cell array 50 on a first portion 41 of the substrate 40. The solar cell array 50 includes one or more solar cells 52. The solar cells 52 are operative to produce an electric current for powering the sensor assembly 30 when light strikes the solar cells. Power produced by the solar cell array 50 is output through one or more leads 54.

The second portion 32 of the sensor assembly 30 includes a second portion 42 of the substrate 40. The leads 54 from the solar cells 52 extend across the second portion 42 of the substrate 40.

The third portion 33 of the sensor assembly 30 includes a plurality of photoelectric cells 60 and 62 located on a third portion 43 of the substrate 40. The photoelectric cells 60 and 62 are preferably photoconductive cells whose resistance is proportional to the intensity of light impinging on the cells. The photoelectric cells 60 and 62 may alternatively, as described below, be photovoltaic cells, which generate a voltage proportional to the intensity of light impinging on the cells.

The photoconductive cell 60 is a first photoconductive cell, or reference cell, of the sensor assembly 30. The photoconductive cell 62 is a second photoconductive cell, or active cell, of the sensor assembly 30. It should be understood that the reference cell 60 could comprise an array of more than one photoconductive cells, and that the active cell 62 could comprise an array of more than one photoconductive cells.

The reference cell 60 has a front surface 64 and an opposite back surface (not shown). The front surface 64 of the reference cell 60 is covered so that light can not impinge on the front surface 64 of the reference cell. The front surface 64 of the reference cell 60 may be covered by painting over or in any other manner. In addition, the third portion 33 of the substrate 30 is opaque, so that light can not impinge on the back surface of the reference cell 60. As a result, the reference cell 60 sees a constant amount of light, and has a constant electrical resistance, regardless of lighting conditions. The reference cell 60 thus provides a reference output signal 61 (FIG. 4), over one or more lead wires 66 (FIG. 3), that is independent of the amount of ambient light at the window 20.

The active cell 62 has a front surface 68 and an opposite back surface (not shown). The front surface 68 of the active cell 62 is not covered, and therefore light can impinge on the front surface. The third portion 33 of the substrate 30 prevents light from impinging on the back surface of the active cell 62. The active cell 62 therefore has a resistance that varies depending on the amount of light impinging on the front surface 68 of the active cell. As a result, the active cell 62 provides an output signal 63 (FIG. 4), over one or more lead wires 72 (FIG. 3), having a first characteristic if the active cell is exposed to light and a second characteristic if the active cell is not exposed to light.

The fourth portion 34 of the sensor assembly 30 includes an electronics package 80. The lead wires 66 from the reference cell 60 and the lead wires 72 from the active cell 62 extend into the electronics package 80 on the fourth portion 34 of the sensor assembly 30. The lead wires 54 from the solar cell array 50 also extend into the electronics package 80.

The electronics package 80 (FIG. 4) includes a microprocessor or similar electronic circuitry 82 operative to receive signals from the active cell 62 and the reference cell 60 and process them in a manner described below. The electronics package 80 includes a battery 84 that is charged by the output of the solar cells 52. The battery 84 provides power for the other parts of the sensor assembly 30.

The microprocessor 82 determines the difference 86 between the output 61 of the reference cell 60 and the output 63 of the active cell 62. This difference 86 is output as an open (high) or closed (low) output to an RF transmitter 88. The transmitter 88 is operative, in response, to transmit a signal 90 indicative of the open or closed state of the window 20, to a receiver 92 elsewhere on the vehicle 12. The transmitter 88 and an antenna 94 may be provided as part of the electronics package 80.

The apparatus 10 can provide a warning signal if the window 20 is open and the vehicle ignition is turned off. For example, the vehicle operator may shut off the engine of the vehicle 12 and exit the vehicle, leaving the window 20 in the open condition as shown in FIG. 1. If this occurs, ambient light 100 strikes the front surface 68 of the active cell 62. As a result, the output of the active cell 62 has a first characteristic that is different from the output of the reference cell 60, which is covered. The output of the active cell 62 is compared with the output of the reference cell 60 by the circuitry 82. The difference 86, which is not zero and is therefore indicative of an open condition of the window 20, is directed to the transmitter 88 where an appropriate signal is transmitted to the receiver 92. The receiver 92 can be connected with other vehicle electric circuitry in order to, for example, illuminate a warning light (not shown) on the vehicle instrument panel.

When the window 20 is in the closed condition as shown in FIG. 1, the door frame 16 and the seal 18 prevent light from striking the front surface 68 of the active cell 62. The substrate 40 prevents light from striking the back surface 70 of the active cell 62. As a result, the output of the active cell 62 has a second characteristic that is the same as the output of the reference cell 60, which is covered. The output of the active cell 62 is compared with the output of the reference cell 60 by the circuitry 82. The difference 86, which is zero and is therefore indicative of a closed condition of the window 20, is directed to the transmitter 88 where an appropriate signal is transmitted to the receiver 92.

In a general low light condition, the sensor assembly 30 can sense vehicle interior lighting as opposed to ambient lighting. For example, when the vehicle ignition is first turned off and the vehicle door 14 is opened, the vehicle interior lighting comes on for a programmed time period to assist the occupant in getting out of the vehicle 12. This interior lighting can be sensed by the sensor assembly 30 to provide an indication of a window open condition.

The apparatus 10 can provide a warning signal even in very low light conditions. For example, the window 20 may at times be rolled all the way down in the door frame 16, so that the upper portion 22 of the window is inside the door cavity (not shown). In this case, the ambient light level should still be high enough to produce a difference between the output of the active cell 62 and the output of the reference cell 60. If not, then the apparatus 10 could be designed so that at least a portion of the active cell 62 is on the upper edge surface 20 of the window 20, to achieve a higher light sensitivity.

In a second embodiment of the invention, the photoelectric cells 60 and 62 are photovoltaic cells rather than photoconductive cells. The circuitry 82 is operative to look at the difference between the voltage output of the reference cell 60 and the voltage output of the active cell 62 to determine if the active cell is covered (indicating a closed window) or uncovered (indicating an open window). In this case, the photovoltaic cells 60 and 62 may be used as the power supply for the sensor assembly, obviating the solar cells.

During the lifetime of the apparatus 10, the photoconductive cells 60 and 62 may age, so that their output changes. Both the reference cell 60 and the active cell 62, however, age at the same rate. Thus, any aging of the active cell 62 will be counterbalanced by similar aging of the reference cell 60, so that the active cell does not provide false readings.

Figure 5:
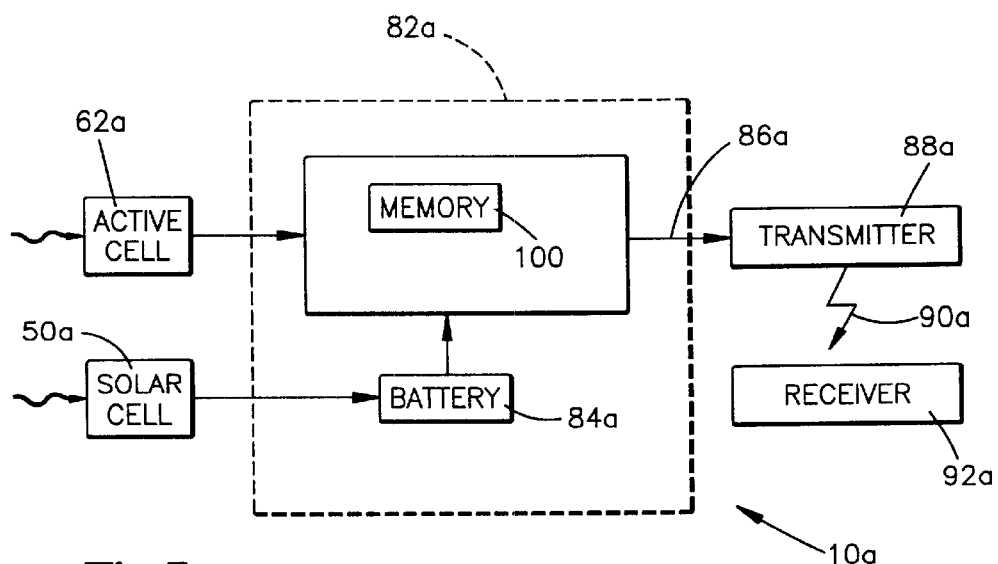
FIG. 5 is a functional block diagram similar to FIG. 3 of an apparatus in accordance with a second embodiment of the invention.

FIG. 5 is a functional block diagram of an apparatus 10a in accordance with a second embodiment of the invention. The apparatus 10a is similar in construction to the apparatus 10 (FIGS. 1–4). Parts of the apparatus 10a that are the same as or similar to corresponding parts of the apparatus 10 are given the same reference numerals with the suffix "a" attached.

In the apparatus 10a (FIG. 5), the reference cell value is programmed into the microprocessor 82a. Specifically, the microprocessor 82a includes a memory 100 in which is stored a value equivalent to the output of a reference cell 60. This eliminates the need for the reference cell itself, and allows use of only the active cell 62a in the sensor assembly. This can make the apparatus 10a simpler and less expensive than the apparatus 10 (FIGS. 1–4). The apparatus 10a does not, however, obtain the above-mentioned benefit of the reference cell 60, specifically, that its presence helps to alleviate concern about aging of the active cell 62a.

Figure 6:
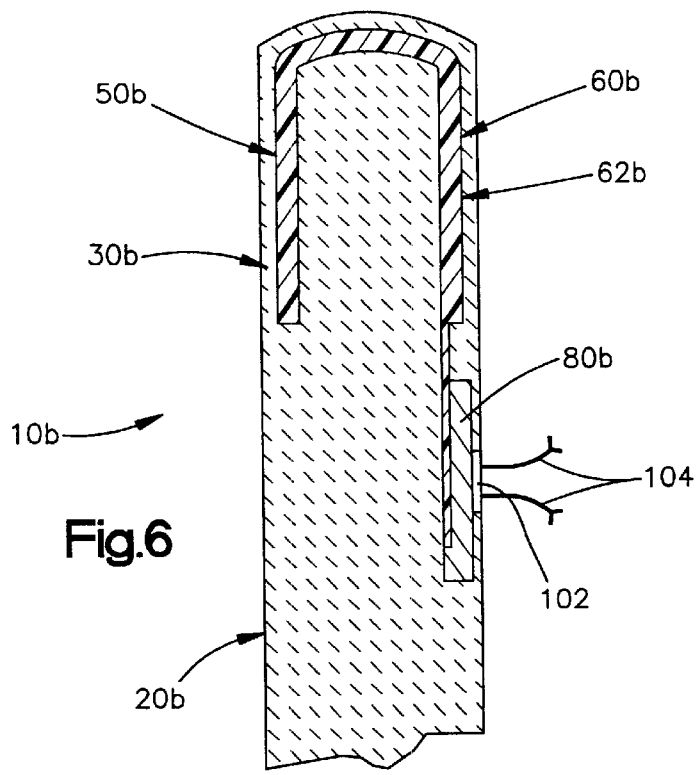
FIG. 6 is a view similar to FIG. 1 of an apparatus in accordance with a third embodiment of the invention.

FIG. 6 illustrates an apparatus 10b in accordance with a fourth embodiment of the invention. The apparatus 10b is similar in construction to the apparatus 10 (FIGS. 1–4). Parts of the apparatus 10b that are the same as or similar to corresponding parts of the apparatus 10 are given the same reference numerals with the suffix "b" attached.

The apparatus 10b includes a sensor assembly 30b that may be the same as the sensor assembly 30a, but excluding the transmitter 88. The sensor assembly 30b is molded into the window glass during the manufacture of the window 20. The active cell 62b and the reference cell 60b are both exposed to ambient light when the window 20b is in the down or open condition.

One or more contacts 102 are provided on the glass 20b. The contacts 102 are electrically connected with the sensor assembly 30b. Wires 104 are soldered to the contacts 102. Alternatively, a connector (not shown) may be glued on the window 20b and wire connections made with press down terminals. The output of the sensor assembly 30b is directed through the wires 104 to vehicle electric circuitry, to be processed and used as described above.

Figure 7:
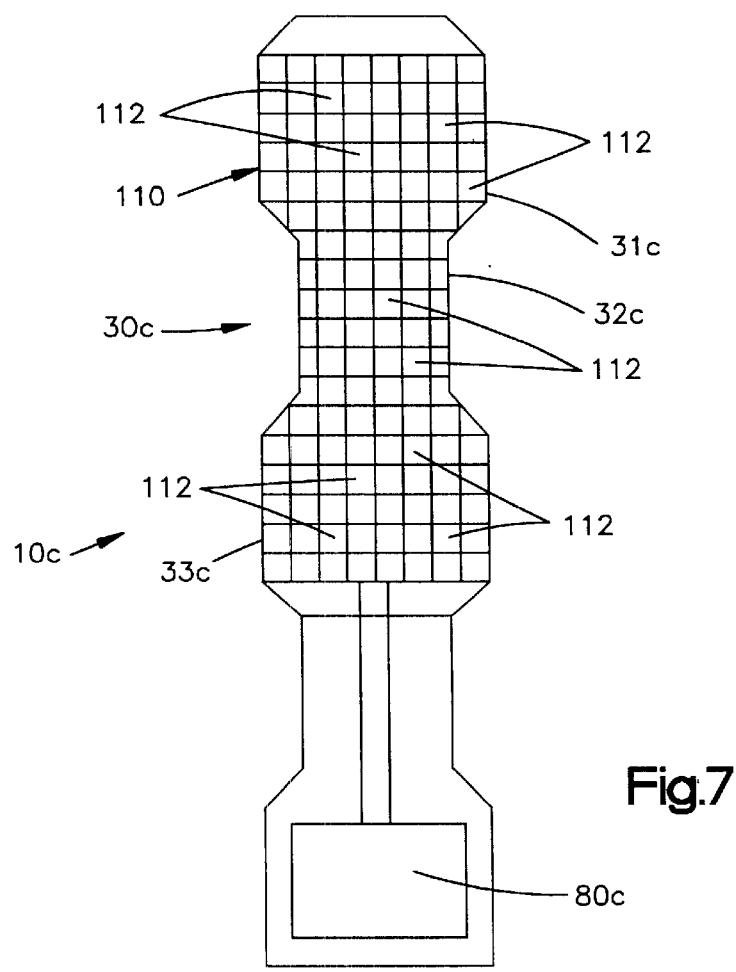
FIG. 7 is a view similar to FIG. 3 of a sensor assembly that forms part of an apparatus in accordance with a fourth embodiment of the invention.
Figure 8:
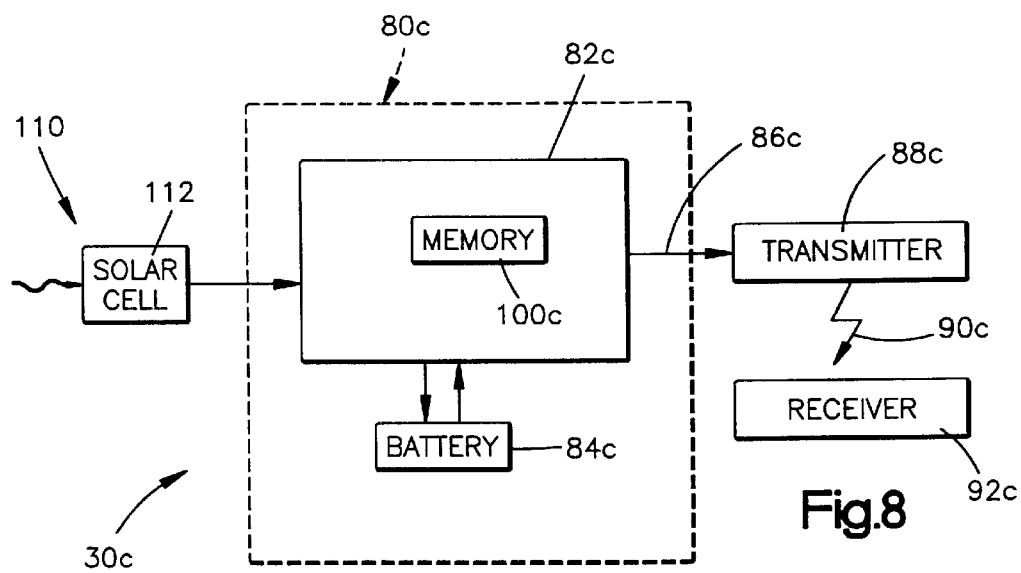
FIG. 8 is a functional block diagram of the apparatus assembly of FIG. 7.

FIGS. 7 and 8 illustrate an apparatus 10c in accordance with a fifth embodiment of the invention. The apparatus 10c is similar in construction to the apparatus 10 (FIGS. 1–4). Parts of the apparatus 10c that are the same as or similar to corresponding parts of the apparatus 10 are given the same reference numerals with the suffix "c" attached.

The apparatus 10c includes a sensor assembly 30c that is similar to the sensor assembly 30 (FIG. 3). In the sensor assembly 30c, however, a single array 110 (FIG. 7) of photovoltaic cells 112 extends across the first, second and third portions 31c, 32c and 33c of the sensor assembly. The output of the array 110 of photovoltaic cells 112 is connected with the electronics package 80c. The electronics package 80c includes a memory 100c.

The array 40 of photovoltaic cells 110 in the apparatus 10c serves two functions. First, the array 112 of photovoltaic cells 110 provides power for the sensor assembly 30c. Second, the output of the array 110 of cells 112 varies depending on the amount of light impinging on the array. Thus, the array 110 of photovoltaic cells 112 provides an output value to the electronics package 80c that can be used to determine the open or closed state of the window.

From the above description of the invention, those skilled in the art will perceive improvements, changes and modifications in the invention. For example, that the present invention is applicable to windows that are not located in doors of a vehicle. The invention is applicable also to a vehicle window whose upper portion is received in a channel in a door frame, covering both inner and outer side surfaces of the window upper portion. Such improvements, changes and modifications within the skill of the art are intended to be covered by the appended claims.

Having described the invention, I claim:

1. Apparatus for detecting a window open condition, said apparatus comprising:

a first photoelectric cell mountable to the window for providing a reference output signal independent of the window open condition;

a second photoelectric cell mountable to the window and providing a signal having a first characteristic if the window is open and a second characteristic if the window is not open;

comparison means for comparing the reference output signal with the signal from the second photoelectric cell, said comparison being indicative of the open condition of the window; and indicator means, responsive to said comparison means, for indicating if the vehicle window is in the open condition.

2. Apparatus as set forth in claim 1 wherein said means responsive to said comparison means comprises an RF transmitter.

3. Apparatus as set forth in claim 1 further comprising a solar cell for providing electric power for said apparatus.

4. Apparatus as set forth in claim 1 wherein said photoelectric cells are photoconductive cells.

5. Apparatus as set forth in claim 1 wherein said photoelectric cells are photovoltaic cells.

6. Apparatus as set forth in claim 1 wherein said first photoelectric cell and said second photoelectric cell and said comparison means and said means responsive are provided a part of a sensor assembly mounted as one piece to the outside of the window.

7. Apparatus as set forth in claim 6 wherein said means responsive comprises an RF transmitter.

8. Apparatus for detecting a window open condition, said apparatus comprising:

a first photoelectric cell mountable to the window for providing a reference output signal independent of the window open condition;

a second photoelectric cell mountable to the window and providing a signal having a first characteristic if the window is open and a second characteristic if the window is not open;

comparison means for comparing the reference output signal with the signal from the second photoelectric cell, said comparison being indicative of the open condition of the window; and indicator means, responsive to said comparison means, for indicating if the vehicle window is in the open condition;

wherein said window is molded or cast from glass and said first photoelectric cell and said second photoelectric cell and said comparison means and said means responsive are provided as part of a sensor assembly molded or cast with said window.

9. Apparatus for association with a window movable between an open condition and a closed condition, a first amount of light striking the window when the window is in the open condition and a second amount of light striking the window when the window is in the closed condition, said apparatus comprising:

detector means mounted to the window for detecting the amount of light striking the window; and determining means responsive to said detector means for determining, in response to the amount of detected light, if the vehicle window is in the open condition.

10. Apparatus as set forth in claim 9 wherein said detector means comprises at least one photoelectric cell.

11. Apparatus as set forth in claim 10 wherein said determining means comprises a memory in which is stored a reference value.

12. Apparatus as set forth in claim 9 wherein said detector means comprises a first photoelectric cell whose output varies dependent on the amount of light impinging on said first photoelectric cell and a second photoelectric cell whose output is independent of the amount of light impinging on said second photoelectric cell.

13. Apparatus as set forth in claim 9 further comprising means responsive to said determining means for indicating if the vehicle window is in the open condition.

\* \* \* \* \*